United States Patent
Welbon et al.

(10) Patent No.: US 7,430,737 B2
(45) Date of Patent: Sep. 30, 2008

(54) PROCESSOR AND METHOD FOR SUPPORTING COMPILER DIRECTED MULTITHREADING MANAGEMENT

(75) Inventors: Edward Hugh Welbon, Austin, TX (US); Jose Mario Gallegos, Pflugerville, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 966 days.

(21) Appl. No.: 10/727,477

(22) Filed: Dec. 4, 2003

(65) Prior Publication Data

US 2005/0125791 A1 Jun. 9, 2005

(51) Int. Cl.
- G06F 9/455 (2006.01)
- G06F 9/46 (2006.01)
- G06F 7/38 (2006.01)
- G06F 9/00 (2006.01)
- G06F 9/44 (2006.01)
- G06F 15/00 (2006.01)

(52) U.S. Cl. .................... 718/1; 718/100; 718/102; 712/220

(58) Field of Classification Search .............. 718/102, 718/103, 1, 100; 709/103; 712/220, 233
See application file for complete search history.

(56) References Cited

U.S. PATENT DOCUMENTS

| | | | |
|---|---|---|---|
| 5,694,604 A | 12/1997 | Reiffin | |
| 5,907,702 A | 5/1999 | Flynn et al. | |
| 6,073,159 A * | 6/2000 | Emer et al. | 718/103 |
| 6,088,788 A | 7/2000 | Borkenhagen et al. | |
| 6,167,461 A * | 12/2000 | Keats et al. | 710/5 |
| 6,694,425 B1 | 2/2004 | Eickemeyer | |
| 6,826,752 B1 * | 11/2004 | Thornley et al. | 718/100 |
| 6,889,319 B1 * | 5/2005 | Rodgers et al. | 712/228 |

FOREIGN PATENT DOCUMENTS

WO WO 00/36491 6/2000

OTHER PUBLICATIONS

"OpenMP API User's Guide"; Sun Microsystems; Online; May 2003, XP002320626; pp. 1-1; pp. 1-10-pp. 1-15.
Sato, Mitsuhisa; Association For Computing Machinery: OpenMP: Parallel Programming API for Shared Memory Multiprocessors and On-Chip Multiprocessors (Extended Abstract); 15th International Symposium on System Synthesis; Kyoto, Japan; Oct. 2002; International Symposium on System Synthesis; New York, NY: ACM, US, Oct. 2002; pp. 109-111, XP010655197.
International Search Report Application No. PCT/US2004/040527; International Filing Date Dec. 3, 2004; Mailed Mar. 23, 2005.
Written Opinion of the International Search Report Application No. PCT/US2004/040527; Mailed Mar. 23, 2005.
Examination Report in Application No. GB0613117.1, Mailed Nov. 28, 2006.
Examination Report Under Section 18(3) in application No. GB0613117.1 issued Apr. 17, 2008.

* cited by examiner

*Primary Examiner*—Meng-Ai An
*Assistant Examiner*—Qing-Yuan Wu
(74) *Attorney, Agent, or Firm*—Meyertons Hood Kivlin Kowert & Goetzel, P.C.; Stephen J. Curran (57) ABSTRACT

In one embodiment, a processor includes an execution unit configured to execute one or more threads and a detection unit coupled to detect whether a given thread includes an identifier. The execution unit is further configured to selectively continue execution of the given thread depending upon whether the detection unit detects the identifier.

17 Claims, 6 Drawing Sheets

PROCESSOR AND METHOD FOR SUPPORTING COMPILER DIRECTED MULTITHREADING MANAGEMENT

BACKGROUND OF THE INVENTION

1. Field of the Invention

This invention relates to multithreading processors and, more particularly, to managing the execution of multiple threads in a multithreading processor.

2. Description of the Related Art

Multithreading typically refers to executing multiple threads from one or more processes at a particular time. One type of multithreading processor is capable of executing multiple threads without using multiple cores. Multithreading may provide capabilities similar to a multiprocessor system (two or more logical processors) while using just one physical processor. A process refers to an application that is being executed by a processor. The process may consist of a private virtual address space, executable code, data and other operating system resources. Also, a process may have one or more execution threads. A thread, which is sometimes referred to as a lightweight process or execution context, is an execution path or flow of control through a given process. A thread's current state, which is represented by a current program counter, a call/return stack, the processor's registers, and some thread-specific data, allows the processor to freeze a thread (i.e., stop executing it) and to continue execution at a later time from the point where the thread was stopped.

Sharing a single processor between multiple threads may minimize the time required to switch between threads because a minimum amount of information may need to be saved and restored when switching from one thread to another. A minimum amount of information may need to be saved and restored because the program execution environment is shared between the different threads. This is in contrast to a standard context switch in a normal execution process.

Programmers write multithreaded application software to enhance the performance of an application. Since multithreaded programs may be written to execute in parallel instead of serially, multithreading may save execution time by allowing parts of a process to be independently executed.

Although current multithreading technologies may speed up the execution of processes by executing multiple threads at one time, a significant amount of execution time may be wasted on particular threads having instructions that are not ready to be executed. One method to overcome this problem is to switch from one thread to another or suspend execution of a current thread when the system detects that the current thread is taking too long to execute. For example, if execution of an instruction results in a cache miss or unavailability of resources during execution of the current thread, then the processor may switch to another thread that is ready-to be executed. However, this method may require executing the particular instruction that caused the cache miss, which may inherently result in wasted execution time.

SUMMARY OF THE INVENTION

Various embodiments of a processor and method for supporting compiler directed multithreading management are disclosed. In one embodiment, a processor includes an execution unit configured to execute one or more threads and a detection unit coupled to detect whether a given thread includes an identifier. In addition, the execution unit may be configured to selectively continue execution of the given thread depending upon whether the detection unit detects the identifier.

In another embodiment, a method of generating low-level instructions executable by a processor includes providing a computer program including high-level programming instructions and detecting whether an indicator is included within the computer program. The method further includes, in response to detecting the indicator, generating a low-level instruction having an identifier corresponding to the indicator. The low-level identifier may be configured to cause the processor to selectively continue execution of a given thread.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
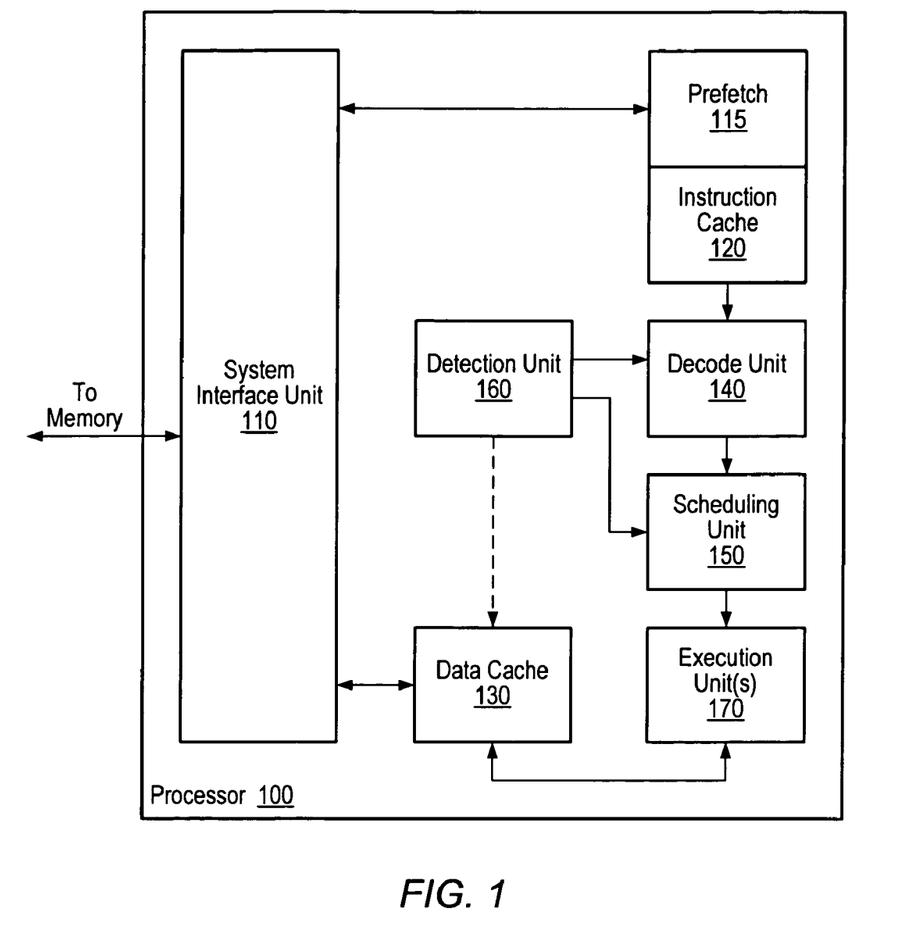
FIG. 1 is a block diagram of one embodiment of a multithreading processor.

Turning now to FIG. 1, a block diagram of one embodiment of a multithreading processor 100 is shown. Processor 100 includes a system interface unit 110 coupled to a prefetch unit 115, an instruction cache 120, and to a data cache 130. Processor 100 also includes a decode unit 140 coupled to the instruction cache 120 and to a scheduling unit 150. In addition, a detection unit 160 is coupled to the scheduling unit 150 and to the decode unit 140. Further, execution unit(s) 170 is coupled to the scheduling unit 150 and the data cache 130.

It is noted that processor 100 may be representative of a processor in the SPARC™ family of processors. However, it is contemplated that in other embodiments, processor 100 may be representative of other types of processors such as a processor in the x86 family of processors, for example.

In the illustrated embodiment, system interface unit 110 is coupled to provide processor 100 with access to system resources. For example, prefetch unit 115 may prefetch instructions from memory through system interface unit 110 and temporarily store the instructions in instruction cache 120. In one embodiment, the instructions may be decoded by decoding unit 140 and sent to the scheduling unit 150. Scheduling unit 150 is configured to schedule the decoded instructions for execution in the execution pipeline. In one embodiment, scheduling unit 150 may store the decoded instructions in an execution queue in a particular execution order.

In the illustrated embodiment, processor 100 is a multithreading processor. More particularly, execution unit(s) 170 may be configured to execute one or more execution threads in a pipelined manner. For example, execution unit(s) 170 may access the queue to retrieve the next instruction to execute. In addition, data cache 130 is configured to provide any necessary data to execution unit(s) 170 during execution of a given thread. In one embodiment, processor 100 may be a superscalar processor. As such, execution unit (s) 170 may be an execution core including multiple integer execution units, multiple floating-point units, and a load/store unit, which are not shown for simplicity. In another embodiment, execution unit(s) 170 may include additional execution cores. However, it is contemplated that in other embodiments the execution unit(s) 170 may include a single integer execution unit and a single floating point unit.

In the illustrated embodiment, detection unit 160 is configured to detect whether a current thread (i.e., the thread for which instructions are currently being executed or the thread for which instructions are being fetched) includes an identifier. In one embodiment, the identifier may be indicative that the current thread may be suspended and a different thread may be executed. In addition, execution unit 170 is configured to selectively continue execution of the current thread depending upon whether the detection unit detects the identifier. In one embodiment, detection unit 160 may detect whether a decoded instruction includes the identifier. Although in other embodiments, detection unit 160 may also be coupled to data cache 130 (as denoted by the dashed lines) to detect whether a particular piece of data that may be used to execute the current thread may include the identifier. It is noted that although detection unit 160 is shown as a separate component of processor 100, it is contemplated that in alternative embodiments, the functionality of detection unit 160 may be included within other functional blocks such as decoding unit 140 or scheduling unit 150 for example.

In one embodiment, processor 100 may include counter logic (not shown) that tracks how long a current thread is taking to execute from the point at which the decision is made to continue execution of the current thread. In such an embodiment, counter logic may be configured to count a number of execution cycles. If processor 100 is still waiting on the current thread after a predetermined number of execution cycles, processor 100 may switch to a different thread. It is noted however that in other embodiments, processor 100 may track how long a current thread is taking to execute using various other methods, such as counting processor clock cycles, for example.

As will be described in greater detail below, the identifier may be included within a thread as an instruction, the identifier may be part of an instruction or the identifier may be included as part of a piece of data consumed during execution of a thread. In addition, the identifier may be information that is associated with the instruction.

Figure 2:
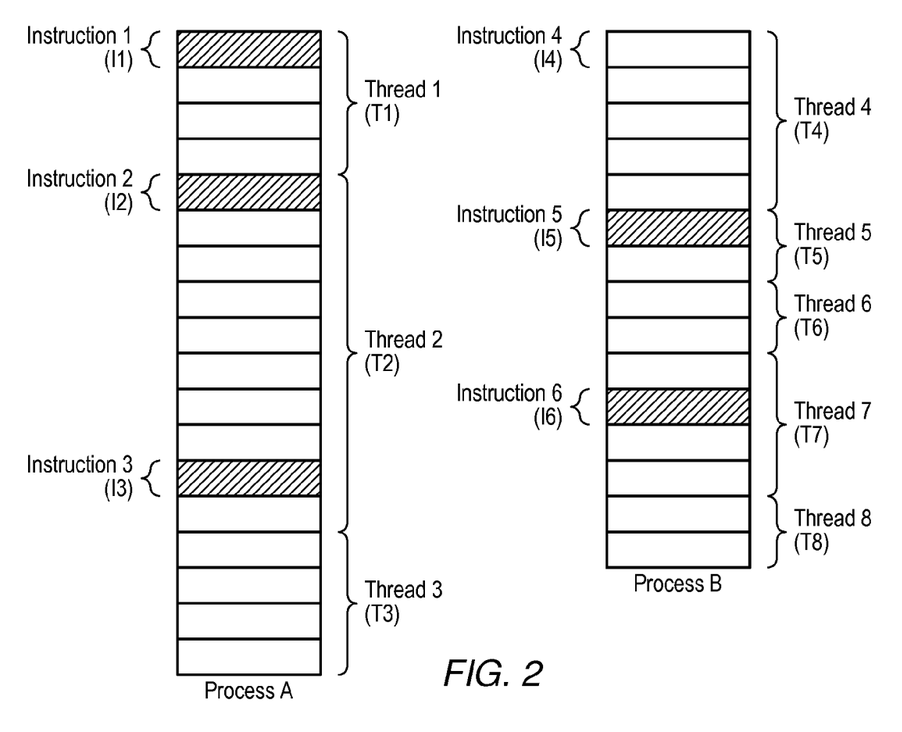
FIG. 2 is a diagram illustrating two processes having multiple execution threads.

Referring to FIG. 2, a diagram illustrating two processes having multiple execution threads is shown. In the illustrated embodiment, Process A and Process B represent two independent processes that may be executed by a processor, such as processor 100 of FIG. 1. Process A is divided into three execution threads and these are designated T1, T2, and T3, and Process B is divided into five execution threads and these are designated T4, T5, T6, T7, and T8. However, it is noted that a particular process may be divided into any number of threads as desired. Each of the execution threads includes one or more instructions and, as noted above, each thread may be executed in parallel to take advantage of the multithreading capabilities of the processor.

Furthermore, as described above, a given thread may include an identifier. In the illustrated embodiment, the shaded areas correspond to instructions associate with an identifier and the unshaded areas correspond to instructions without an identifier. For example, Instruction 1 (I1) is an instruction having an identifier and Instruction 4 (I4) is an instruction that does not have an identifier. In addition, an execution thread may include one or more instructions having an identifier. For example, Thread 2 (T2) is an execution thread that has two different instructions (I2, I3) each having an identifier. On the other hand, a thread may not have any identifiers. For example, none of the instructions in Thread 3 (T3) have an identifier.

In one embodiment, the identifier (sometimes referred to as a hint) associated with a given thread is configured to inform processor 100 that the execution of the given thread may be suspended until it can be more efficiently executed or that a different thread may be executed before the given thread. For example, the given thread may include an identifier to communicate to processor 100 that it will be subject to a MUTEX if it executes a particular instruction within the given thread. A MUTEX may refer to a mutual exclusion object that allows multiple threads to synchronize access to a shared resource (sometimes called mutual exclusion of threads). For example, a MUTEX may be used to protect a section of code from being executed by more than one thread. Since a MUTEX may block other threads from being executed, the identifier may inform processor 100 to suspend execution of this particular thread, which is subject to the MUTEX, and to execute a different thread.

In another embodiment, an identifier may be indicative that the current thread may be suspended and a different thread may be executed depending on one or more execution parameters. For example, as will be discussed in greater detail below, processor 100 may suspend a current thread and execute a different thread if an identifier is detected and a priority scheme indicates to switch to the other thread.

In an alternative embodiment, the identifier may be indicative that processor 100 should continue to execute the current thread and to override a global execution parameter. As used herein, a global execution parameter may be used to inform hardware how to respond to a particular event or operation. For example, a global execution parameter may, in the absence of an identifier, cause processor 100 to unconditionally suspend execution of the current thread due to a cache miss caused by execution of a particular instruction and to switch to a different thread. However, the presence of the identifier may indicate to processor 100 that there will only be a short wait time (i.e., a local cache miss) and to continue execution of the current thread, thereby overriding the global execution parameter. In this instance, execution time corresponding to the latency associated with a thread switch may be saved. For example, depending on the specific implementation, a thread switch may take two clock cycles; therefore, it may be more efficient not to switch threads.

In one embodiment, the identifier may be a flag included within a particular instruction of the given thread. For example, one or more unused op-code bits or other bits of the particular instruction may be used. In another embodiment, the identifier may be a unique instruction within the given thread. In such an embodiment, the sole function of the unique instruction may be to inform the processor that the current thread may be suspended if another thread is waiting to execute. In yet another embodiment, the identifier may be information that is associated with a given instruction but may follow a different path than the given instruction. For example, the identifier may be included within data or metadata that is associated with a given instruction. The data including the identifier associated with the instruction may be similar to information stored along with a cache line in a cache memory, for example.

Depending on the implementation, the identifier may include one or more bits that may be encoded to have different meanings. For example, one encoding may be associated with causing the processor to suspend execution of the current thread and to switch to a different thread, while a different encoding of the same identifier may cause the processor to continue execution.

Figure 3:
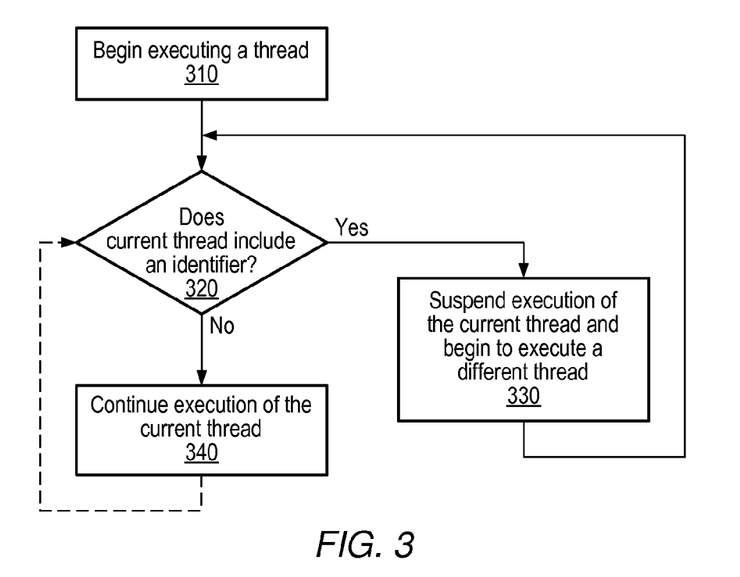
FIG. 3 is a flow diagram describing the operation of one embodiment of the processor of FIG. 1.

FIG. 3 is a flow diagram describing the operation of one embodiment of the multithreading processor of FIG. 1. Referring collectively to FIG. 1 and FIG. 3, processor 100 is a multithreading processor configured to execute one or more threads at a time. In one embodiment, the software scheduler of the operating system allocates memory space for a particular thread that is ready to be executed. The address of the particular thread is placed in a run queue to wait to be executed. Prefetch unit 115 fetches the instructions associated with a given thread, which is now the current thread, and once the instructions are decoded, execution unit(s) 170 may begin to execute the instructions associated with the current thread (block 310). During execution of the current thread, detection unit 160 is configured to detect whether the current thread includes an identifier (block 320). Specifically, in one embodiment, the detection unit 160 is configured to detect whether one or more decoded instructions of the current thread include an identifier or are associated with an identifier. It is noted however that detection unit 160 may be configured to detect whether the current thread includes an identifier before commencing execution of the current thread. For example, an identifier may be detected in a thread prior to the first instruction entering the execution pipeline.

If the current thread does not include an identifier, processor 100 continues execution of the current thread (block 340). Referring back to block 320, if detection unit 160 detects an identifier, processor 100 suspends execution of the current thread and starts executing a different thread (block 330). Once processor 100 begins execution of the different thread, detection unit 160 is configured to detect whether the different thread includes an identifier (block 320). As described above, detection unit 160 may detect whether the different thread includes an identifier before commencing execution of the different thread.

Figure 4:
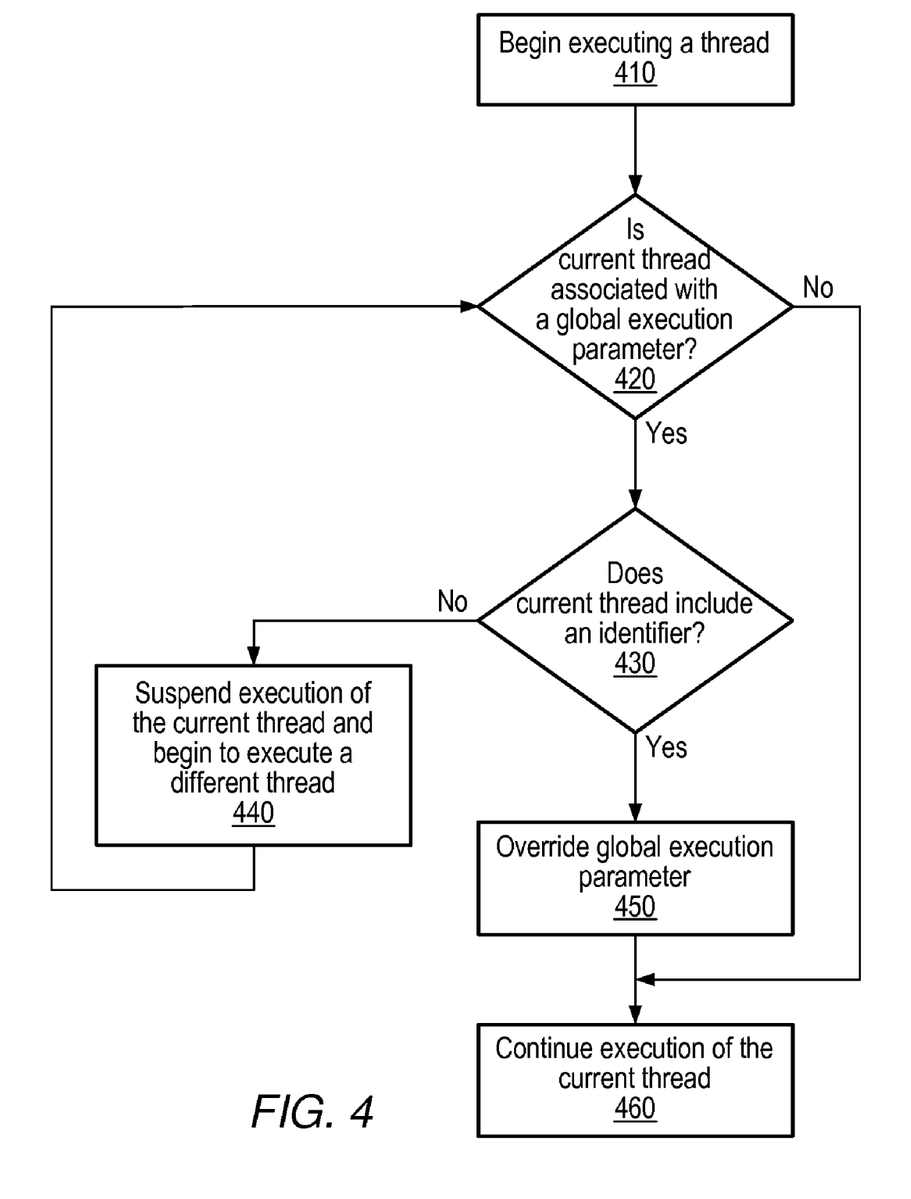
FIG. 4 is a flow diagram describing the operation of one embodiment of the processor of FIG. 1.

Turning now to FIG. 4, a flow diagram describing the operation of another embodiment of the processor of FIG. 1 is shown. Beginning with block 410, processor 100 is configured to execute one or more threads. Processor 100 determines whether a current thread is associated with a global execution parameter (block 420). As noted above, the global execution parameter may be indicative that processor 100 should unconditionally switch to another thread if one is awaiting execution. If the current thread is not associated with a global execution parameter, then the processor 100 continues execution of the current thread (block 460). Referring back to block 420, if the current thread includes a global execution parameter, detection unit 160 is configured to detect whether the given thread also includes an identifier (block 430). More particularly, detection unit 160 is configured to detect whether one or more instructions of the current thread include an identifier or are associated with an identifier.

If the current thread does not include an identifier, execution of the current thread is suspended and a different thread is executed (block 440). Referring back to block 430, if the current thread includes an identifier, the global execution parameter is overridden (block 450) and execution of the current thread is continued (block 460). To illustrate using an example, processor 100 continues execution of the current thread even if, for example, there is a cache miss because the identifier may be indicative that the cache miss was local and will therefore incur only a short latency. In an alternative embodiment, processor 100 may first determine whether the current thread includes an identifier and then determine whether the current thread is associated with a global execution parameter.

Figure 5:
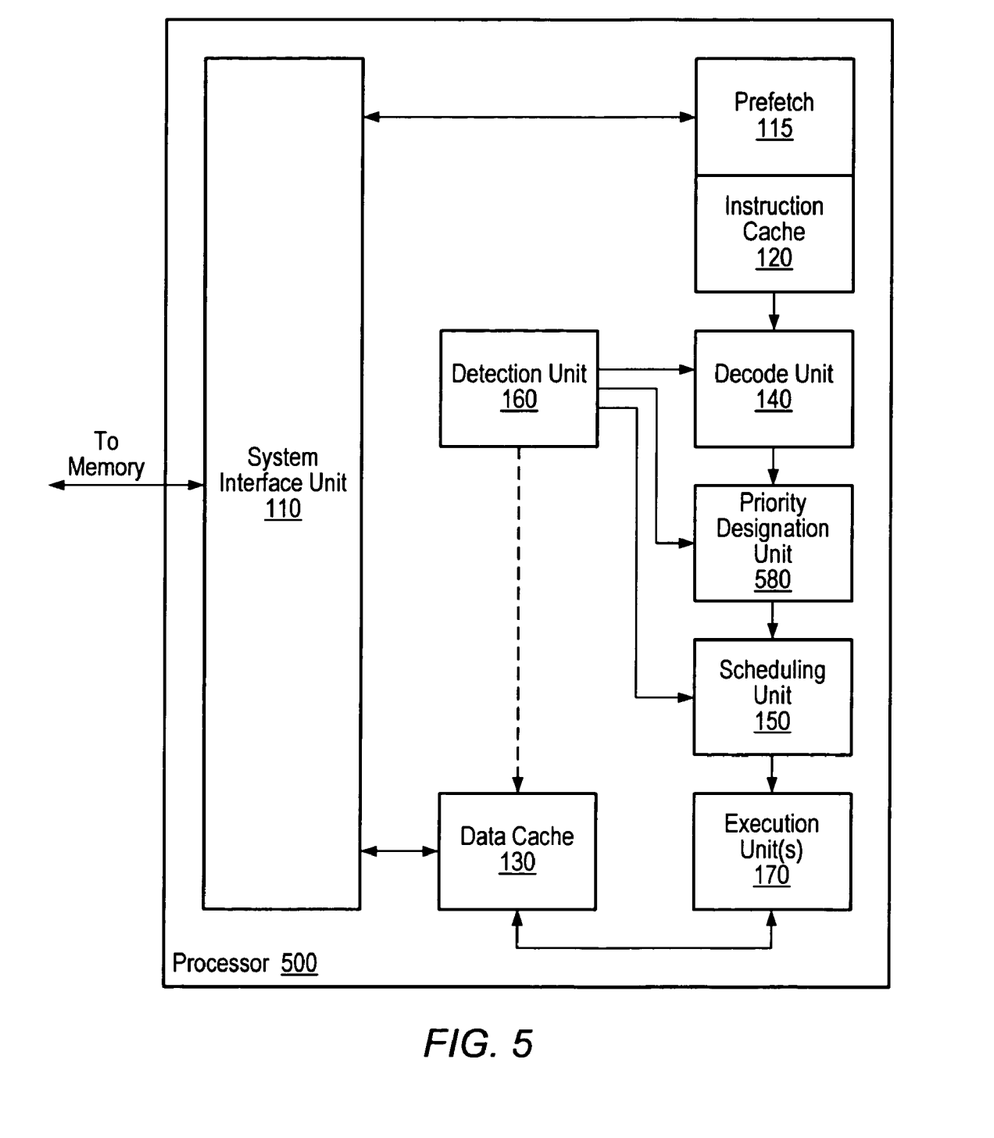
FIG. 5 is a block diagram of another embodiment of a multithreading processor.

Turning now to FIG. 5, a block diagram of another embodiment of a multithreading processor is shown. Components that correspond to those shown in FIG. 1 are numbered identically for clarity and simplicity. In addition to the functional blocks shown in processor 100 of FIG. 1, processor 500 of FIG. 5 includes a priority designation unit 580 which is coupled between decode unit 140 and scheduling unit 150. Accordingly, the description of some of the various other blocks that corresponds to the description of FIG. 1 above has been omitted for simplicity. As noted above, the management of multiple threads in processor 500 may include execution parameters that may control when particular threads are executed and when particular threads are suspended.

In one embodiment, priority designation unit 580 is configured to determine the priority level of each thread. In such an embodiment, the priority level of a given thread may be assigned during compile time. As such, priority designation unit 580 may store the priority of each thread in a storage device such as a register, for example. When the instructions of a particular thread are decoded, the priority level may be determined and stored. However, it is noted that other methods of associating a particular priority level to each thread may be used.

In another embodiment, priority designation unit 580 is configured to re-assign a particular priority level to the current thread based upon conditions associated with the execution environment. For example, in one embodiment, priority designation unit 580 may assign to the current thread a high priority level or a low priority level relative to other threads dependent upon the aging of the current thread. Thus, a priority assigned by software may be changed by hardware during execution of the current thread. In such an embodiment, priority designation unit 580 may change the priority of the current thread in response to detection unit 160 detecting an identifier.

Accordingly, regardless of how the priority of a given thread is assigned and/or determined, in one embodiment, processor 500 may be configured to selectively continue execution of a current thread dependent upon whether detection unit 160 detects an identifier and the priority of each thread. For example, if detection unit 160 detects an identifier in the current thread and if priority designation unit 580 determines (after re-assigning priorities) that the priority level of a different thread is higher than the priority level of the current thread, processor 500 may switch to the different thread. However, if priority designation unit 580 determines that the priority level of the current thread is the same as or higher than the priority level of a different thread, processor 500 may be configured to continue execution of the current thread. It is noted that although priority designation unit 580 is shown as a separate functional block, the functionality of priority designation unit 580 may be included within other functional blocks.

In one embodiment, to measure the aging of the current thread, processor 500 may include counter logic (not shown) that tracks how long a current thread is taking to execute. In such an embodiment, counter logic may be configured to count a number of execution cycles. If processor 500 is still waiting on the current thread after a predetermined number of execution cycles, processor 500 may assign the current thread a lower priority. It is noted however that in other embodiments, processor 500 may track how long a current thread is taking to execute using various other methods, such as counting processor clock cycles, for example.

As illustrated in FIG. 5, detection unit 160 is coupled to priority designation unit 580 and detects whether the current thread includes an identifier that is used to determine whether to conditionally continue execution of the current thread. In addition, detection unit 160 may be coupled to communicate to priority designation unit 580 whether the current thread includes the identifier. In such an embodiment, priority designation unit 580 may use the identifier information to assign a new priority level to the current thread. However, as shown in FIG. 5, detection unit 160 is coupled to decode unit 140, to priority designation unit 580, and to scheduling unit 150 to detect identifiers at different points within the execution of the thread; thereby enabling priority designation unit 580 to assign new priority levels at different points during the process. In addition, it is noted that detection unit 160 may be coupled to other components within processor 500.

Figures 6, 7, 8:
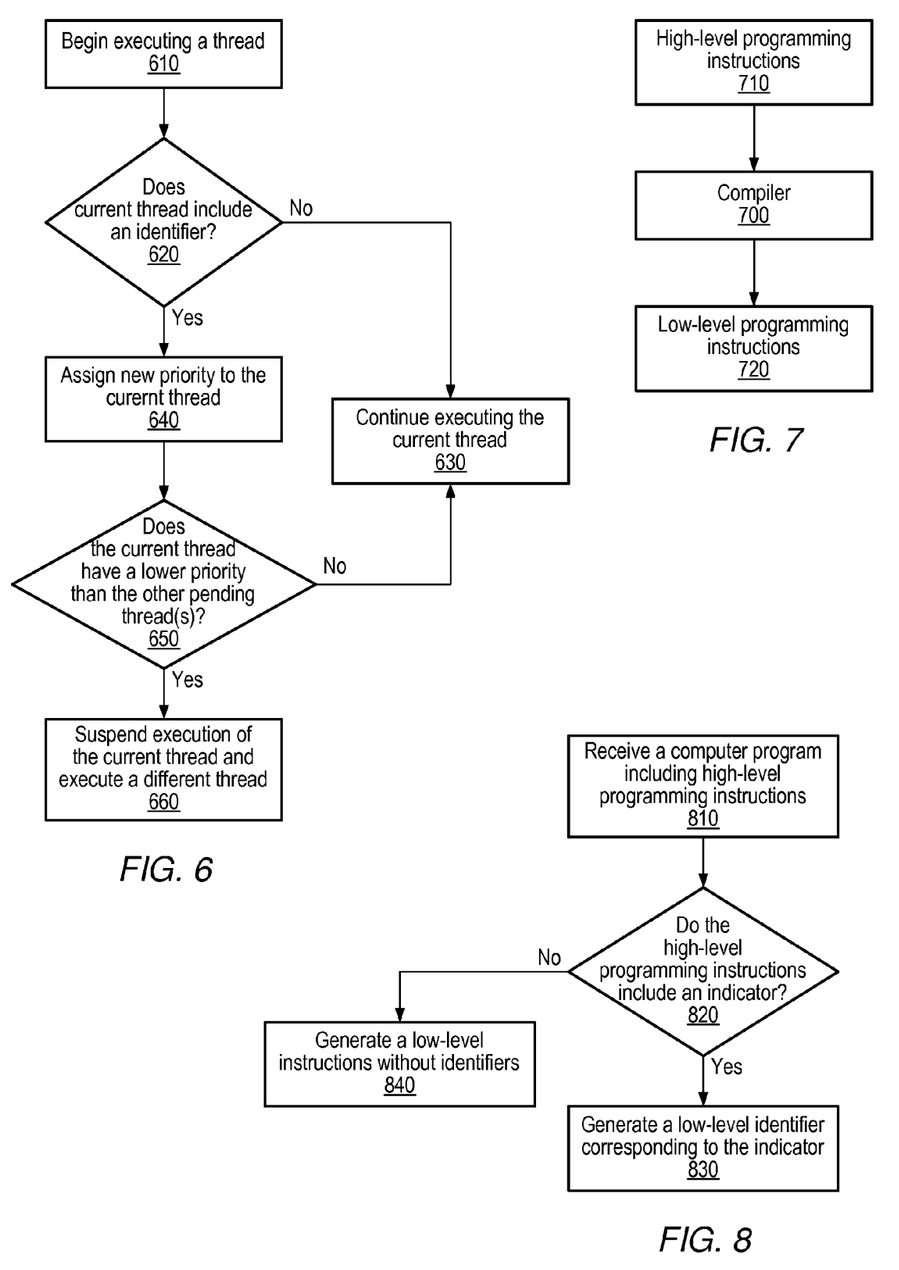
FIG. 6 illustrates a flow diagram describing the operation of one embodiment of the processor of FIG. 5.
FIG. 7 is a diagram illustrating a compiler for converting high-level programming instructions to low-level instructions.
FIG. 8 is a flow diagram describing the operation of one embodiment of the compiler of FIG. 7.

FIG. 6 illustrates a flow diagram describing the operation of one embodiment of the processor of FIG. 5. Referring collectively to FIG. 5 and FIG. 6, processor 500 begins execution of a thread of one or more threads (block 610). Detection unit 160 detects whether the current thread includes an identifier (block 620). If the current thread does not include an identifier, processor 500 continues execution of the current thread (block 630). However, referring back to block 620, if detection unit 160 detects that the current thread includes an identifier, priority designation unit 580 assigns a new priority to the current thread dependent upon the execution environment (block 640).

Once the priority of the current thread is changed, priority designation unit 580 determines whether the current thread has a higher or lower priority than the other pending thread(s) (block 650). If the current thread does not have a lower priority than the other pending thread(s), processor 500 continues execution of the current thread (block 620). In one embodiment, processor 500 continues execution of the current thread until it finishes executing the current thread or until another identifier is detected (block 620). Referring back to block 650, if the current thread does have a lower priority than the other pending thread(s), processor 500 suspends execution of the current thread and executes a different thread (process block 660).

In one embodiment, if processor 500 determines that a particular thread does not have a priority level, then the processor 500 may assign a default priority level to the particular thread. In such an embodiment, the default priority level may be the lowest priority.

Turning now to FIG. 7, a diagram of one embodiment of a compiler for converting high-level programming instructions to low-level instructions is shown. High-level programming instructions 710 may be written in any high-level programming language, such as C, or C++, for example. The low-level instructions 720, which are the output of compiler 700, are representative of a machine language, such as a binary code that may be readily operated on by a processor.

In one embodiment, programmers may write high-level computer programs including high-level instructions 710 and may include an indicator in one or more of the high-level instructions 710. For example, a programmer may have prior knowledge that a particular instruction will take a long time to execute or can determine that statistically it should take a long time to execute, thereby causing the thread which includes the particular instruction to stall. To reduce the effect of such a stall, the programmer may include an indicator in the thread that is indicative that the thread may be suspended and a different pending thread may be executed.

In the illustrated embodiment, compiler 700 detects the indicator and creates an identifier within the corresponding low-level instructions 720. It is noted that the identifier created by the compiler 700 may have the same properties as the identifiers described above in conjunction with the descriptions of FIG. 1 through FIG. 6. For example, the identifier that may be associated with the current execution thread may be a hint to inform the processor that the execution of the current thread may be suspended until it can be more efficiently executed or that a different thread may be executed before the current thread. Alternatively, the identifier that may be associated with a current execution thread may be a hint to inform the processor that the execution of the current thread should continue, irrespective of any global execution parameters to the contrary. Therefore, compiler 700 can detect the indicators within the high-level code and create identifiers, which, when placed into an execution thread, may help manage and guide the selection of threads in the processor as described above.

In one embodiment, the indicator may be a compiler directive or 'pragma'. In another embodiment, the indicator may be an assembly language subroutine that may be embedded within the high-level code. In yet another embodiment, the indicator may be a unique high-level instruction having the sole function of communicating to the compiler that an identifier is required for a particular instruction. In an alternative embodiment, compiler 700 may be configured recognize certain instructions as indicators. For example, compiler 700 may recognize an instruction as one that results in a spin lock.

FIG. 8 depicts a flow diagram describing the operation of one embodiment of the compiler of FIG. 7. Referring collectively to FIG. 7 and FIG. 8, a computer program including high-level programming instructions is provided to compiler 700 (block 810). Compiler 700 detects whether an indicator is included within the high-level computer program (block 820).

If complier 700 detects an indicator, compiler 700 generates a low-level instruction having an identifier corresponding to the indicator (block 830). As described above, the low-level identifier is configured to cause the processor to selectively continue execution of a given thread. However, referring back to block 820, if compiler 700 does not detect an indicator, compiler 700 generates low-level instructions without identifiers (block 840).

Figure 9:
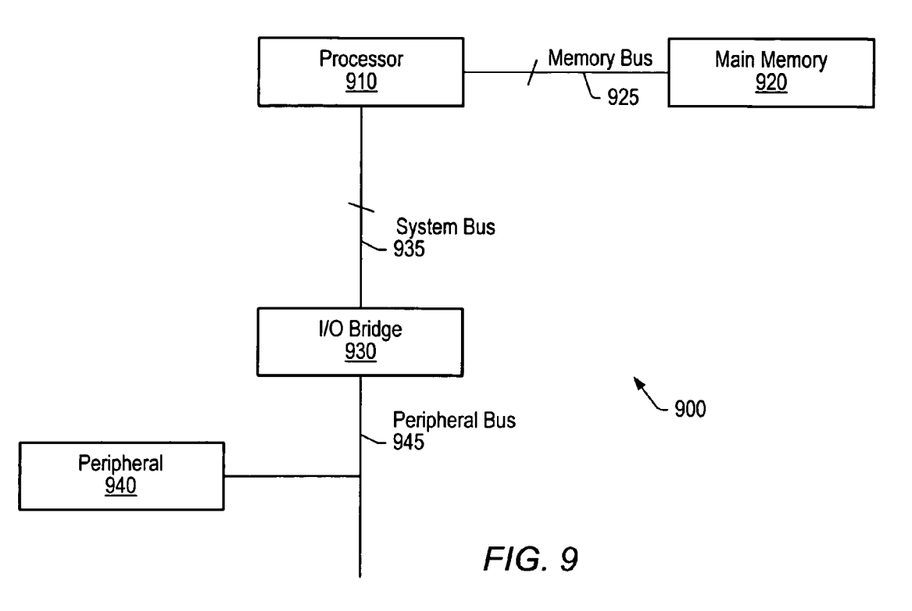
FIG. 9 is a block diagram of one embodiment of a computer system including a multithreading processor.

Turning now to FIG. 9, a block diagram of one embodiment of a computer system including a multithreading processor is shown. Computer system 900 includes a processor 910 coupled to a main memory 920 via a memory bus 925. Computer system 900 also includes an I/O bridge 930 that is coupled to processor 910 via a system bus 935. In addition, computer system 900 includes a peripheral device 940 that is coupled to I/O bridge 930 via a peripheral bus 945. It is noted that in one embodiment, processor 910 may be illustrative of processor 100 of FIG. 1. In another embodiment, processor 910 may be illustrative of processor 500 of FIG. 5.

In the illustrated embodiment, main memory 920 is a memory medium in which application programs are stored and from which processor 910 primarily executes. A suitable main memory 920 may include memory devices in the Dynamic Random Access Memory (DRAM) family of devices. For example, a plurality of banks of Synchronous DRAM (SDRAM), Double Data Rate (DDR) SDRAM, or Rambus DRAM (RDRAM) devices may be suitable.

In addition to main memory 920, computer system 900 may include additional memory mediums (not shown) on which computer programs according to various embodiments may be stored. The term "memory medium" may include an installation medium, e.g., a CD-ROM, or floppy disks, additional system memory such as DRAM, SRAM, extended data output (EDO) DRAM, SDRAM, DDR SDRAM, Rambus RAM, etc., or a non-volatile memory such as a read-only memory (ROM), or magnetic media such as a hard drive, or optical storage. The memory medium may include other types of memory as well, or combinations thereof. The memory medium preferably stores a compiled version of a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A processor, such as processor 910, executing code and data from the memory medium includes a means for creating and executing the software program or programs according to the methods and/or block diagrams described above.

In addition, the memory medium may be located within a second computer system (not shown), which connects to computer system 900 over a network. In this instance, the second computer provides the program instructions to computer system 900 for execution. Also, it is contemplated that computer system 900 may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

In one embodiment, I/O bridge 930 provides an interface between processor 910, main memory 920, and peripheral device 940. When an operation is received from one of the devices connected to I/O bridge 930, I/O bridge 930 identifies the target of the operation and routes the operation to the targeted device. I/O bridge 930 generally translates an operation from the protocol used by the source device or bus to the protocol used by the target device or bus.

In the illustrated embodiment, peripheral device 940 may be illustrative of a variety of peripheral devices such as, for example, network interface cards, video accelerators, audio cards, hard or floppy disk drives or drive controllers, SCSI (Small Computer Systems Interface) adapters and telephony cards. Furthermore, peripheral bus 945 may be illustrative of a variety of peripheral buses such as a peripheral component interconnect (PCI) bus, for example.

It is noted that, while the PCI bus has been used as an example in the above description, any bus architectures may be substituted as desired. It is further noted that computer system 900 may be a multiprocessing computer system including additional processors (not shown). The additional processors may be similar to processor 910. More particularly, the additional processor may be an identical copy of processor 910. The additional processor may be connected to I/O bridge 930 via an independent bus (not shown) or may share system bus 935 with processor 910.

It is noted that computer system 900 is an exemplary computer system and that other computer systems are possible. More particularly, it is contemplated that in other embodiments, processor 100 of FIG. 1 and processor 500 of FIG. 5 may be employed within other types of computers systems. For example, processors 100 and 500 may be employed within computer systems having hierarchical memory structures, such as a non-uniform memory access (NUMA) architectures. In such systems, each processor may have access to a local memory structure in addition to the memory structure of another processor.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
   an execution unit configured to execute one or more threads; and
   a detection unit coupled to the execution unit and configured to detect whether a given thread includes a specific identifier;
   wherein said execution unit is further configured to selectively continue execution of said given thread depending upon whether said detection unit detects said specific identifier;
   wherein said execution unit is configured to suspend execution of said given thread and to execute a different thread in response to receiving a global execution parameter;
   wherein in response to said detection unit detecting said specific identifier, said execution unit is configured to override said global execution parameter and to continue execution of said given thread; and
   a priority designation unit coupled to said detection unit and configured to assign a priority level to said given thread depending upon an execution environment in response to said detection unit detecting said specific identifier.

2. The processor of claim 1, wherein in response to said detection unit detecting a different identifier, said execution unit is configured to suspend execution of said given thread and to execute a different thread.

3. The processor of claim 2, wherein in response to said detection unit detecting that said given thread does not include said different identifier, said executing unit is configured to continue execution of said given thread.

4. The processor of claim 1, wherein in response to said given thread having a priority level lower than said different thread, said execution unit is configured to suspend execution of said given thread and to execute said different thread with a higher priority level.

5. The processor of claim 4, wherein in response to said given thread having a priority level the same as or higher than said different thread, said execution unit is configured to continue execution of said given thread.

6. The processor of claim 1, wherein said specific identifier is a unique instruction.

7. The processor of claim 1, wherein said specific identifier is a flag including one or more unused bits of any instruction of said given thread.

8. The processor of claim 1, wherein said specific identifier is information associated with any instruction of said given thread.

9. A method comprising:
executing one or more threads;
  detecting whether a given thread includes a specific identifier;
  selectively continuing execution of said given thread depending upon whether said specific identifier is detected;
  suspending execution of said given thread and executing a different thread in response to receiving a global execution parameter;
  overriding said global execution parameter and continuing execution of said given thread in response to detecting said specific identifier; and
    assigning a priority level to said given thread depending upon an execution environment in response to detecting said specific identifier.

10. The method of claim 9, wherein in response to detecting a different identifier, suspending execution of said given thread and executing a different thread.

11. The method of claim 10, wherein in response to detecting that said given thread does not include said different identifier, continuing execution of said given thread.

12. A method of generating low-level instructions executable by a processor, said method comprising:
  providing a computer program including high-level programming instructions;
  detecting whether an indicator is included within said computer program; and
  in response to detecting said indicator, generating a low-level instruction having a specific identifier corresponding to said indicator, wherein said low-level identifier is configured to cause said processor to selectively continue execution of a given thread by:
    suspending execution of said given thread and executing a different thread in response to receiving a global execution parameter;
  overriding said global execution parameter and continuing execution of said given thread in response to detecting said specific identifier; and
  assigning a priority level to said given thread depending upon an execution environment in response to detecting said specific identifier.

13. The method of claim 12, wherein said indicator is a compiler directive.

14. The method of claim 12, wherein said indicator is an assembly language subroutine.

15. The method of claim 12, wherein said indicator is a unique high-level instruction.

16. A machine-readable medium comprising program instructions, wherein said program instructions are executable by a processor to:
  execute one or more threads;
    detect whether a given thread includes a specific identifier;
    selectively continue execution of said given thread depending upon whether said identifier is detected;
  suspend execution of said given thread and executing a different thread in response to receiving a global execution parameter;
  override said global execution parameter and continuing execution of said given thread in response to detecting said specific identifier; and
  assign a priority level to said given thread depending upon an execution environment in response to detecting said specific identifier.

17. A processor comprising:
means for executing one or more threads;
  means for detecting whether a given thread includes a specific identifier;
  means for selectively continuing execution of said given thread depending upon whether said specific identifier is detected;
  means for suspending execution of said given thread and executing a different thread in response to receiving a global execution parameter;
  means for overriding said global execution parameter and continuing execution of said given thread in response to detecting said specific identifier; and
  means for assigning a priority level to said given thread depending upon an execution environment in response to detecting said specific identifier.

* * * * *